(12) United States Patent
Martens et al.

(10) Patent No.: US 7,342,850 B2
(45) Date of Patent: Mar. 11, 2008

(54) APPARATUS AND METHOD FOR RECORDING AN INFORMATION ON A RECORDABLE OPTICAL RECORD CARRIER USING OVAL SPOT PROFILE

(75) Inventors: Hubert Cecile Francois Martens, Eindhoven (NL); Erwin Rinaldo Meinders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 272 days.

(21) Appl. No.: 10/536,640

(22) PCT Filed: Dec. 1, 2003

(86) PCT No.: PCT/IB03/05565

§ 371 (c)(1),
(2), (4) Date: May 27, 2005

(87) PCT Pub. No.: WO2004/053852

PCT Pub. Date: Jun. 24, 2004

(65) Prior Publication Data

US 2006/0044986 A1 Mar. 2, 2006

(30) Foreign Application Priority Data

Dec. 6, 2002 (EP) .................................. 02080150

(51) Int. Cl.
*G11B 7/00* (2006.01)

(52) U.S. Cl. .............................. 369/44.23; 369/112.23
(58) Field of Classification Search ..................... None
See application file for complete search history.

(56) References Cited

U.S. PATENT DOCUMENTS

| 5,605,782 | A | | 2/1997 | Put et al. | |
|---|---|---|---|---|---|
| 5,673,246 | A | | 9/1997 | Ootaki et al. | |
| 6,026,072 | A | * | 2/2000 | Taira et al. | 369/275.3 |
| 6,201,777 | B1 | * | 3/2001 | Tsuchiya et al. | 369/53.23 |
| 6,222,801 | B1 | * | 4/2001 | Yoo et al. | 369/44.23 |
| 6,233,209 | B1 | | 5/2001 | Verboom | |

FOREIGN PATENT DOCUMENTS

| EP | 0 814 464 | 12/1997 |
|---|---|---|
| EP | 0814464 | 12/1997 |

* cited by examiner

*Primary Examiner*—William Korzuch
*Assistant Examiner*—Peter Vincent Agustin
(74) *Attorney, Agent, or Firm*—Michael E. Belk

(57) ABSTRACT

To obtain a higher recording density, and thus higher data capacity, it is proposed according to the present invention to reduce the numerical aperture of the optical means (3, 4) in the direction orthogonal to the information recording direction, which is the radial direction for an optical disc, during recording of information to obtain a light beam having a substantially oval spot profile having a shorter axis in the information recording direction, i.e. the tangential direction for an optical disc, compared to the direction orthogonal that to, i.e. the radial direction. Recording marks having a corresponding oval profile arec achieved.

7 Claims, 8 Drawing Sheets

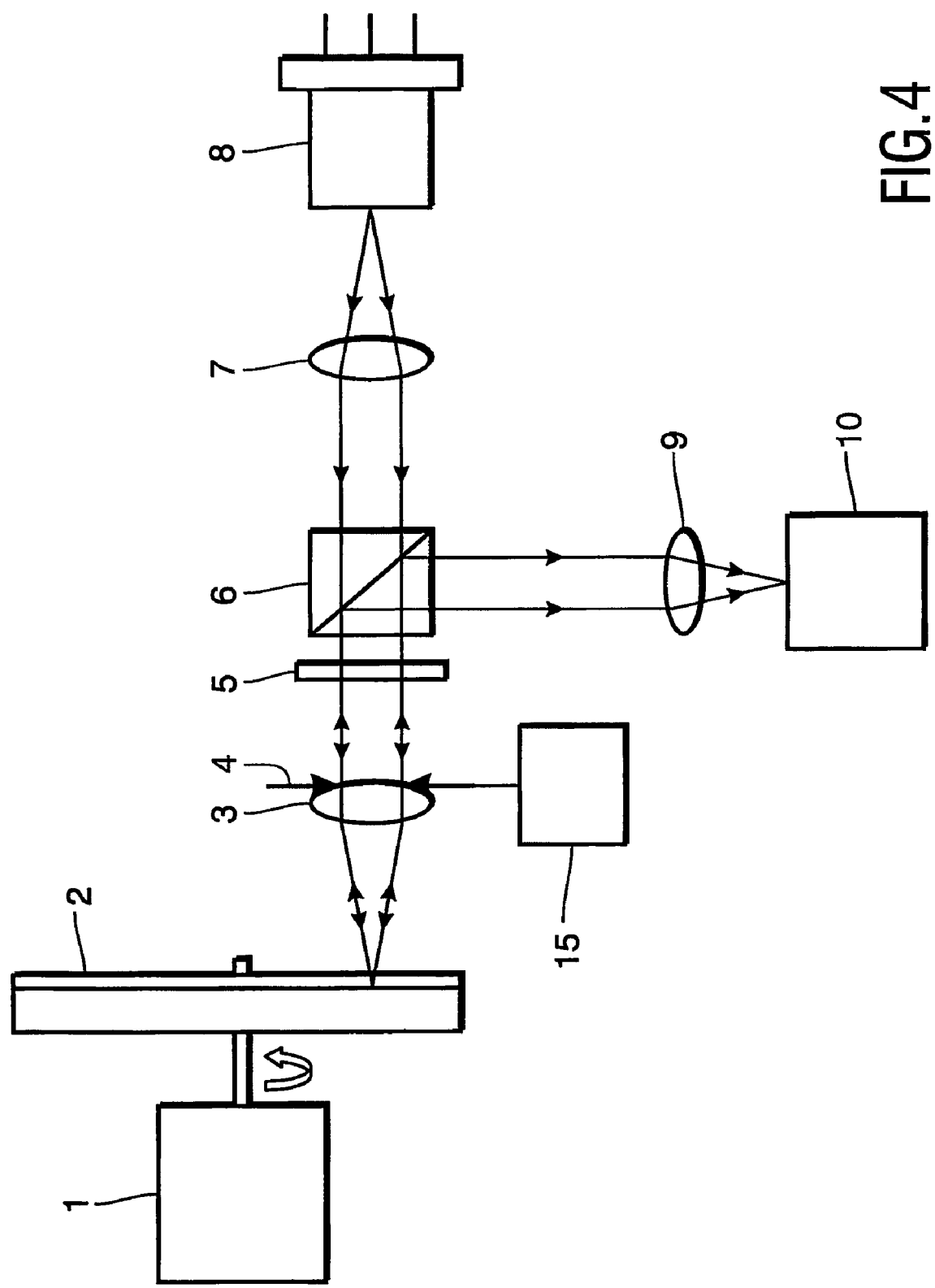

Figure 1A:
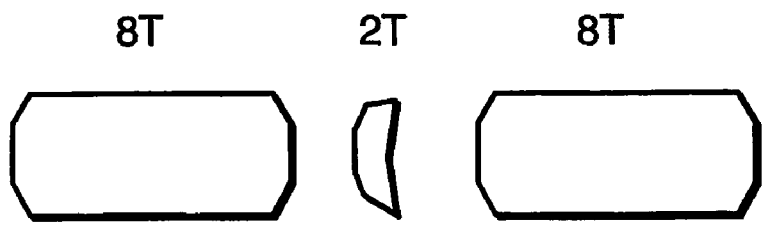

APPARATUS AND METHOD FOR RECORDING AN INFORMATION ON A RECORDABLE OPTICAL RECORD CARRIER USING OVAL SPOT PROFILE

The present invention relates to a an apparatus for recording an information on a recordable optical record carrier by irradiation of a light beam onto said record carrier for forming marks and lands representing said information along an information recording direction. The present invention relates further to a corresponding recording method, an optical record carrier and a computer program for implementing said method.

The total data capacity of optical discs is determined by the radial and tangential data density. The radial density is determined by the data track pitch, the tangential data capacity by the shortest mark that can be written. For rewritable phase-change discs, re-crystallization at the trailing edge of a mark during writing of the next mark is used to obtain a mark of shorter length than the optical spot size. Typically, half of the mark is erased to end up with a crescent shaped mark. For the recently introduced Blu-ray Disc (BD), a total data capacity of 25 Gbyte can be recorded on a single recording layer of a 12 cm disc. The shortest length is 150 nm (d=1 code) while the optical spot is 300 nm in width (1/e radius of the optical spot is 150 nm).

A recordable (write-once) BD format is required in addition to the RW (rewritable) format. This so-called BD-R system should also achieve the high data-capacity of a BD-RW system, i. e. 25 GB, to allow one-to-one copies. In recordable media mark formation occurs when a threshold temperature is exceeded. The mark-formation corresponds to an irreversible change in the information layer, and effects comparable to the re-crystallization in rewritable media in principle do not occur. Thus, the marks that have been recorded in recordable media essentially reflect the optical/thermal profile that was present during the recording process. To reduce the mark length, thus to increase the tangential density, less laser power may be used to write a smaller mark. As a consequence, the modulation of these smaller marks, and thus signal-to-noise ratio, will drop as well. This can be similarly discussed for write-once media based on phase-change material as recording material. The as-deposited amorphous material will re-crystallize to form circularly shaped crystalline marks. Mark length reduction due to post heat is not possible.

U.S. Pat. No. 5,673,246 discloses an optical pick up device which makes a numerical aperture of an object lens in a radial direction of an optical disc smaller than that in a tangential direction to a track on the optical disc. Thus, a spot diameter in the tangential direction to the track becomes smaller than that in the radial direction during read-out. Thus, it is possible to prevent degradation MTF (Modulation Transfer Function) as well as to accurately read data recorded on the disc.

It is therefore an object of the present invention to provide a recording apparatus and a corresponding recording method for recording an information on a recordable optical record carrier by which data capacities can be achieved that are similar to the data capacities of corresponding rewritable optical record carriers.

This object is achieved according to the present invention by a recording apparatus as claimed in claim 1, comprising:
a light source for generating a light beam,
optical means for irradiating said light beam onto said record carrier, wherein said optical means comprise means for reducing the numerical aperture of said optical means in the direction orthogonal to the information recording direction during recording of information to obtain a light beam having a substantial oval spot profile having a shorter axis in the information recording direction compared to the direction orthogonal thereto.

This object is further achieved according to the present invention by a corresponding recording method as claimed in claim 7.

The present invention is based on the idea to use a non-circular spot-profile for the recording process. If the spot-profile is elongated in the radial direction, an oval-like thermal profile on the recording layer is obtained, so that marks can be written that are narrow in tangential direction compared to their radial extent thus increasing the resolution. Such an oval spot profile is obtained according to the present invention by a reduction of the (effective) numerical aperture in the radial direction, i.e. in the direction orthogonal to the information recording direction on an optical record carrier, where the information is recorded along spiral tracks on the disc, is made during the recording process.

The proposed spot modification is also beneficial for high-speed write-once recording. At high recording speeds, thermal in-track interference may hamper the pit formation process. To reduce the thermal in-track interference, an ellipsoidal optical spot, such as obtained with the proposed modification, leads to less direct heating of the previously written pits.

Preferred embodiments of the invention are defined in the dependent claims. An enhancement of the numerical aperture in tangential direction, i.e. in the information recording direction, during the recording process is beneficial as well, but more difficult to realize in practice since a lens re-design will be required.

Different preferred embodiments of the invention defining different methods and means for achieving the proposed reduction of the numerical aperture are claimed in claims 3 to 5. According to said embodiments, for instance, pupil filling, requiring no beam-shaper and proper orientation of an-isotropic light-intensity of the laser, an oval pupil or a mask/diaphragm in the light path can be used to reduce the numerical aperture.

In addition, as defined in claim 6, appropriate control means are provided for switching said switchable means for reduction of the numerical aperture or said switchable liquid crystal means on or off or for bringing said means into the light path during recording and for removing it thereafter, in particular during read-out or RW-recording where spot-deformation is not desired.

An optical record carrier according to the present invention is defined in claim 8 which carries marks having a substantially oval profile having a shorter axis in the information recording direction compared to the direction orthogonal thereto. Further, a computer program comprising computer program means for crossing a computer to perform the steps of the method as claimed in claim 8 when said computer program is run on a computer is defined in claim 9.

Figure 1B:
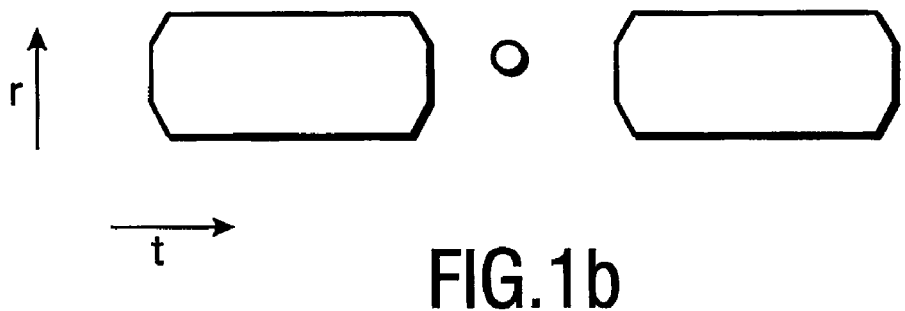
Figure 2A:
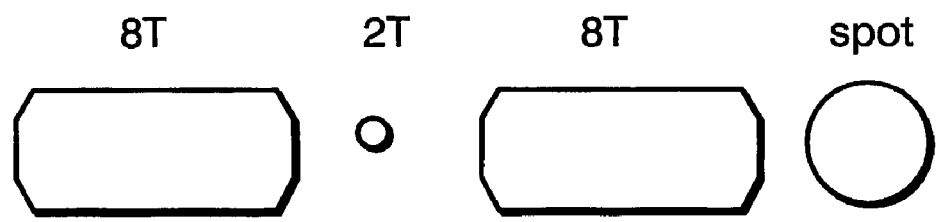
Figure 2B:
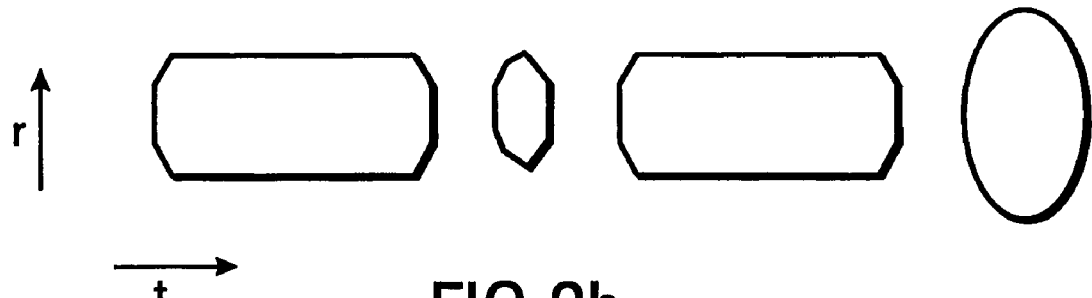
Figure 3A:
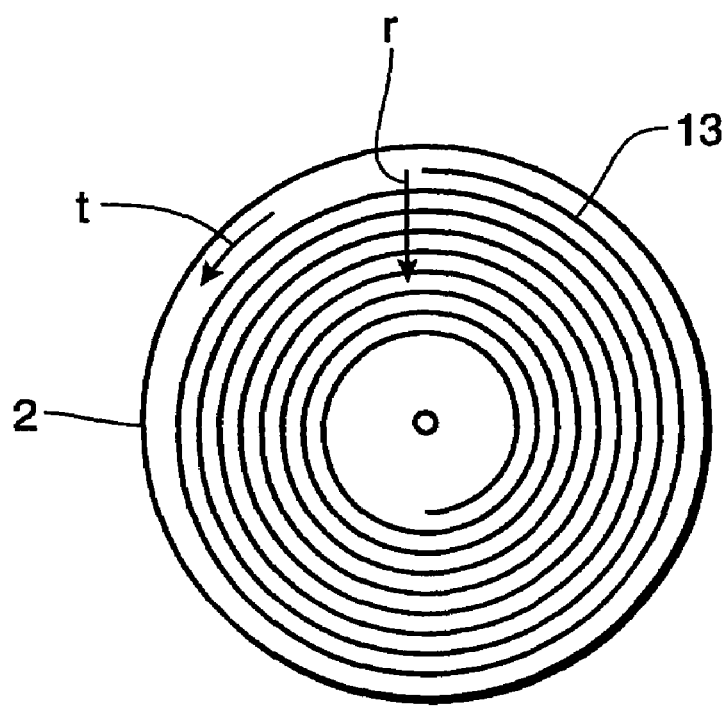
Figure 3B:
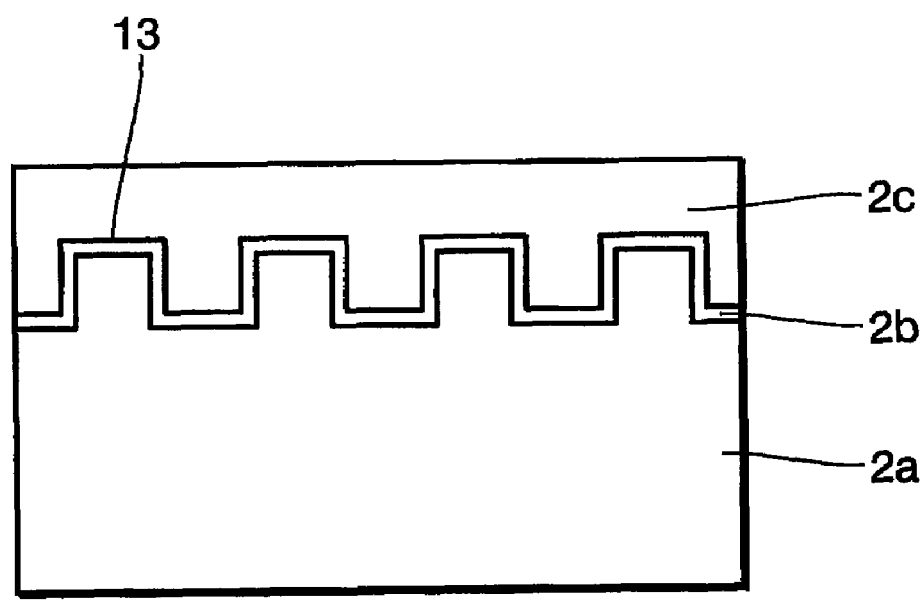
Figure 5:
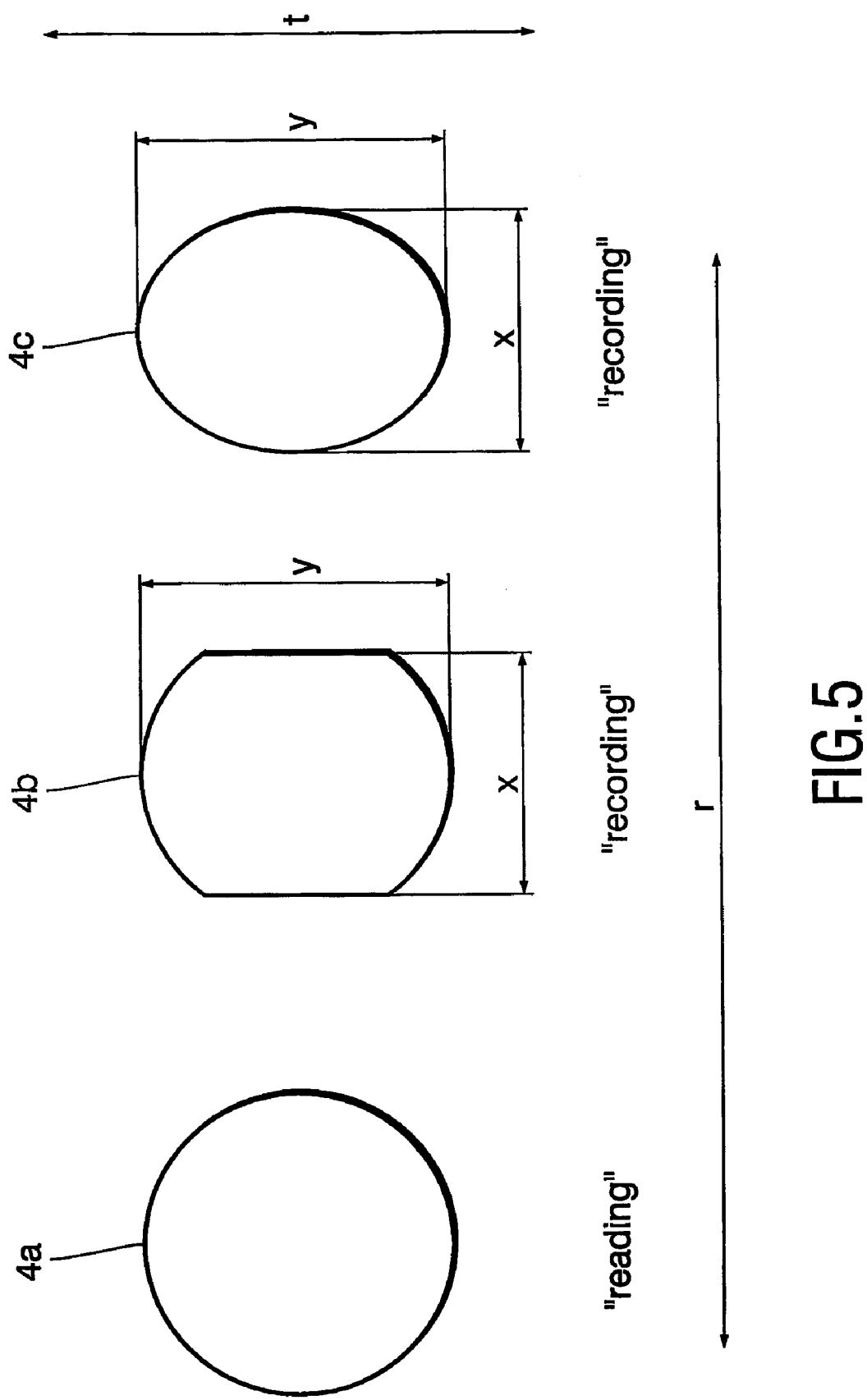
Figure 6:
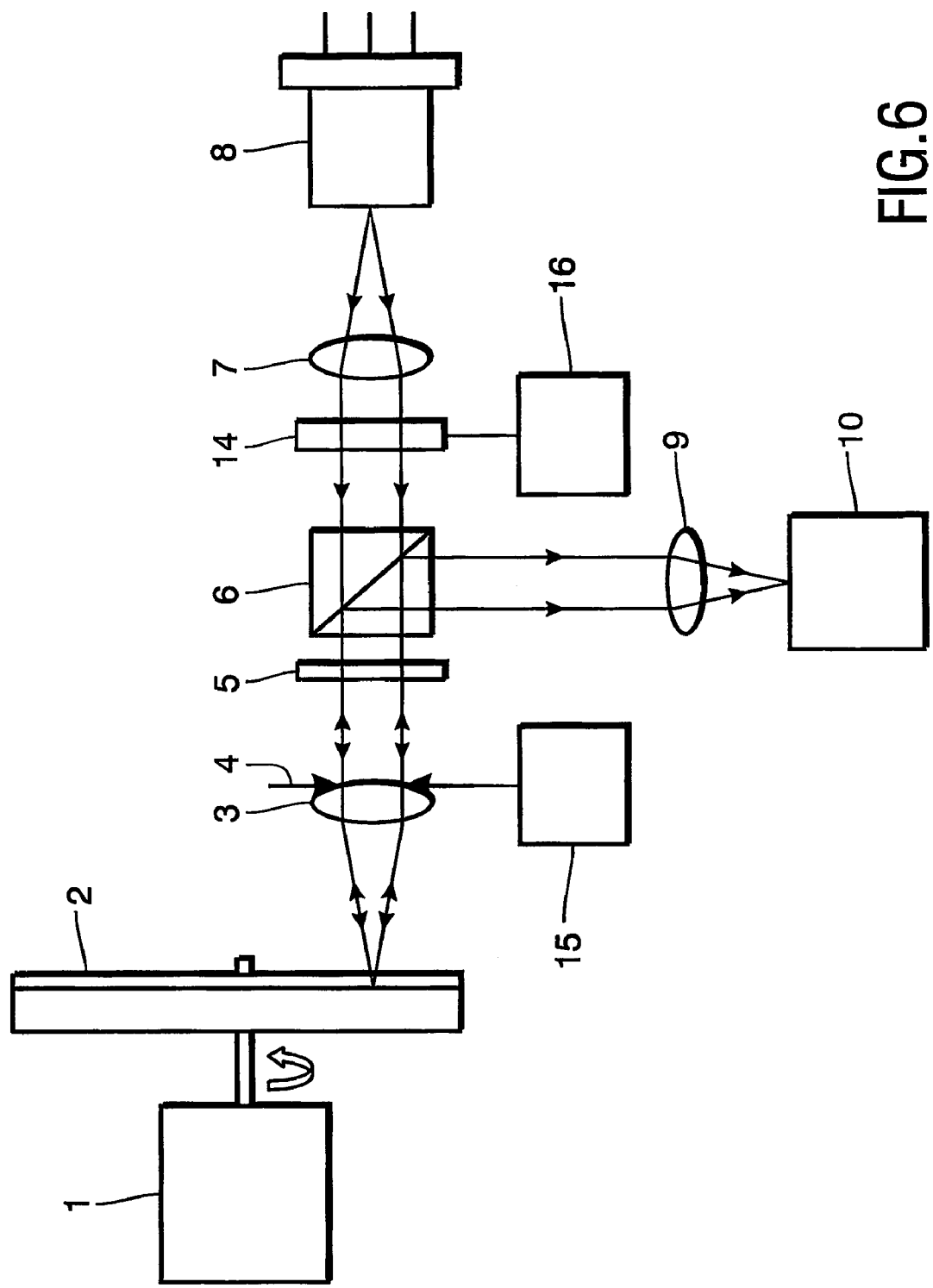
Figure 7:
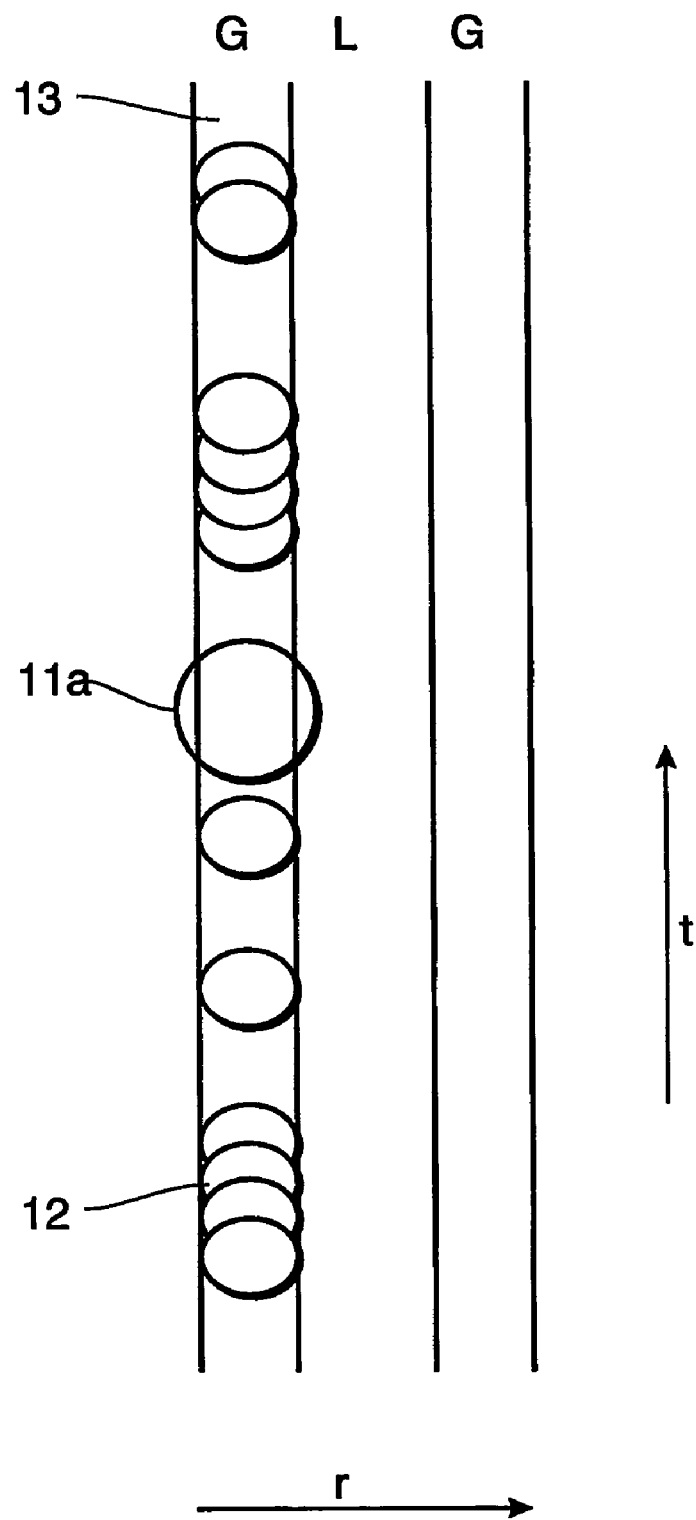
Figure 8:
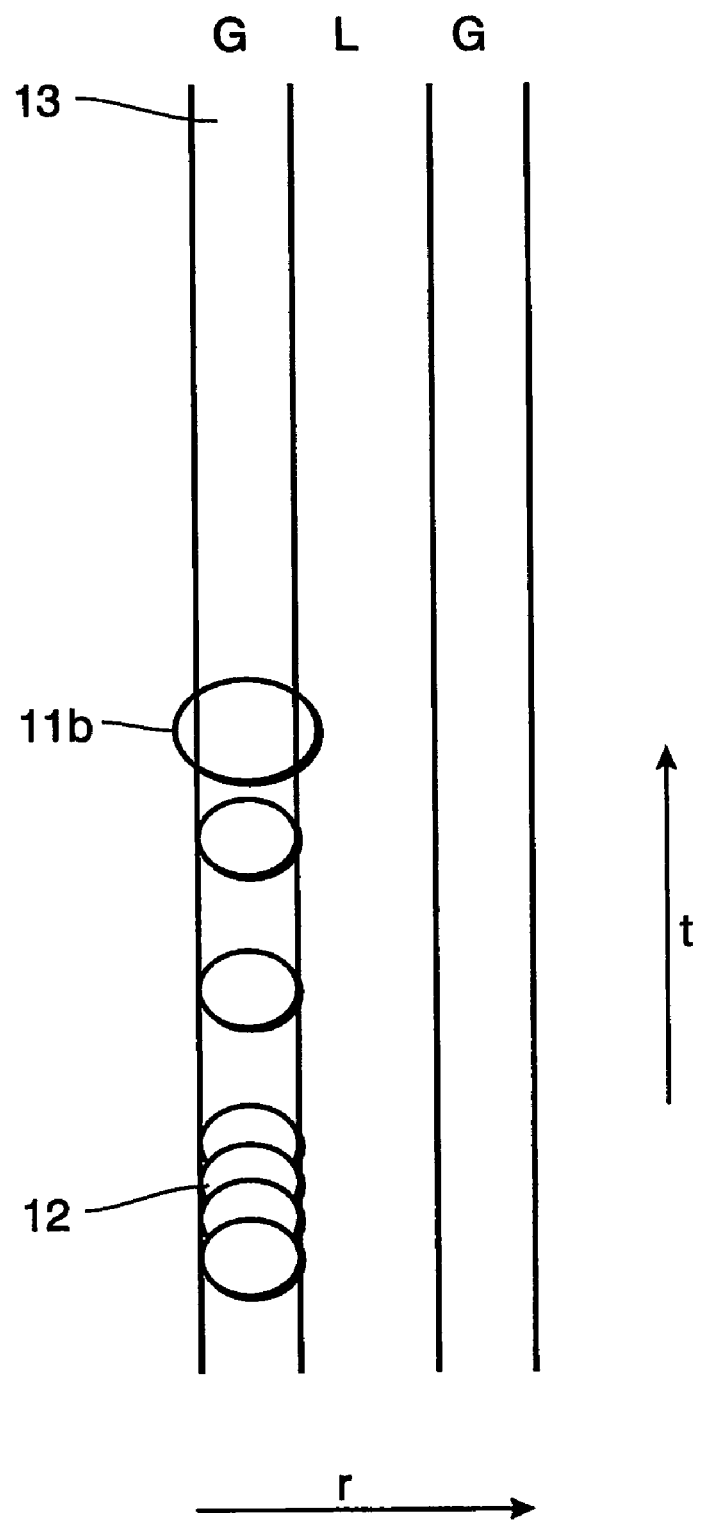
Figure 9:
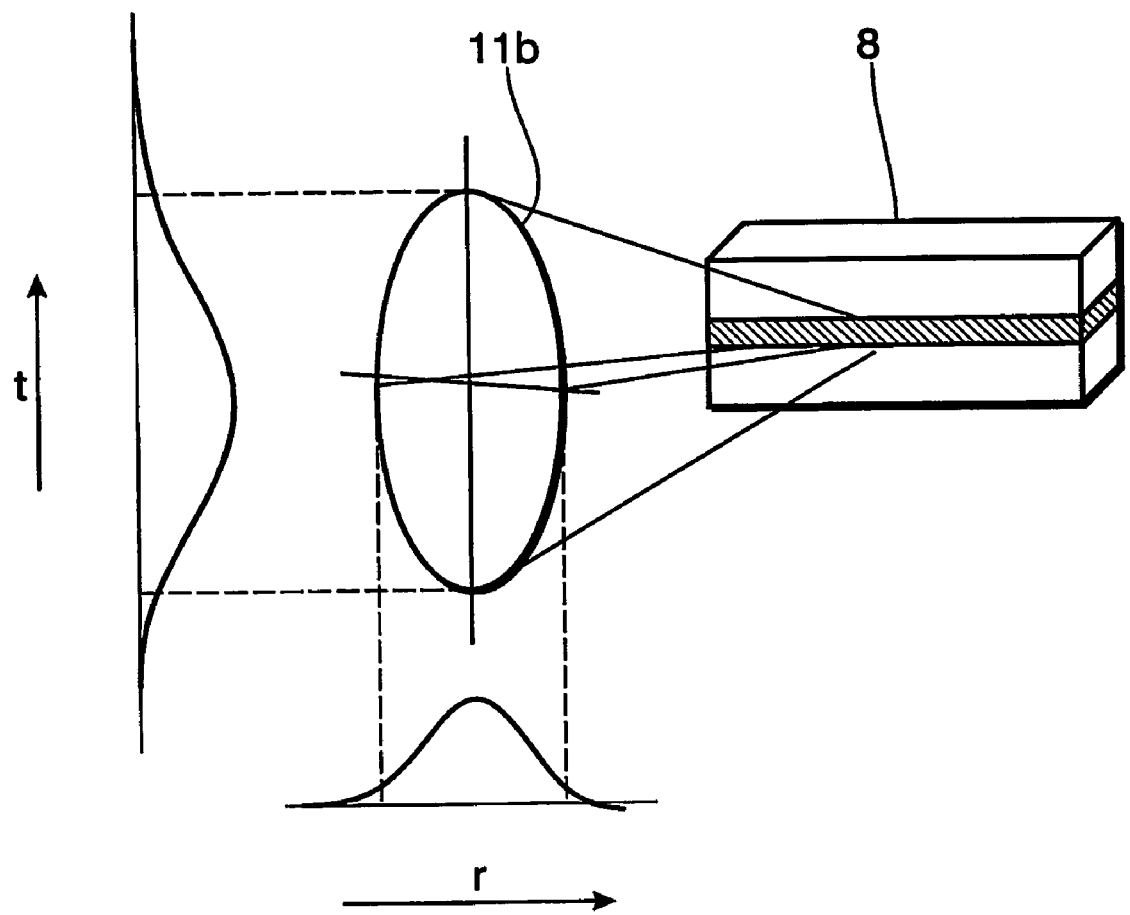

The present invention will now be explained in more detail with reference to the drawings in which FIGS. 1a, 1b show long and short marks recorded on rewritable and recordable record carriers with a circular spot profile, FIGS. 2a, 2b show long and short marks recorded with a circular and an oval spot profile on recordable record carriers, FIGS. 3a, 3b show an optical disc according to the present invention, FIG. 4 shows a first embodiment of a recording apparatus according to the present invention, FIG. 5 shows different embodiments of diaphragms used according to the present invention, FIG. 6 shows a second embodiment of a recording apparatus according to the present invention, FIG. 7 shows the optical spot profile used for read-out of data, FIG. 8 shows the optical spot profile used for recording of data and FIG. 9 shows the light intensity distribution of an oval spot in radial and tangential direction.

To achieve data capacities in write-once systems that are similar to the data capacities of corresponding rewritable systems, very narrow (in tangential direction t) marks need to be written at short runlengths, while in rewritable media the short marks are as broad (in radial direction r) as the long marks. In recordable media the shortest marks are as broad as their lengths, i.e. have a circular shape. Thus, the width of the shortest marks decreases resulting in lower modulation during read-out. This is illustrated in FIG. 1 showing a schematic drawing of long (8T) and short (2T) marks recorded in rewritable (RW) media (FIG. 1a) and recordable (R) media (FIG. 1b) at high density. It shall be noted that the shortest marks are comparable or smaller than the optical spot profile. The consequence is that during read-out, the optical modulation of the shortest marks in recordable media vanishes.

This problem can also be illustrated as well by comparing the resolution (=$2T_{pp}/8T_{pp}$) of the 2T marks for BD-RW and BD-R at a density of 23 GB. According to the BD-RW specification, the 2T resolution should be larger than 10%, and this is met in practice. However, so far even in the best BD-R media the resolution at 23 GB is at most 5%. This poor resolution significantly deteriorates the jitter. The current invention provides a solution to write small but broad marks, i. e. having a high tangential density, such that a high modulation is preserved.

FIG. 2 shows a schematic drawing of long (8T) and short (2T) marks both recorded on a recordable medium. The marks shown in FIG. 2a have been recorded using a circular spot shown on the right-hand side while the marks shown in FIG. 2b have been recorded using an oval spot shown at the right-hand side, said oval spot having a shorter axis in the tangential direction t compared to the axis in the radial direction r. As can be seen the marks shown in FIG. 2b are narrow in the tangential direction t compared to their radial extent and compared to the marks shown in FIG. 2a. Thus, the desired increase of the resolution can be obtained.

FIG. 3 shows a recordable optical disc according to the present invention in a top-view (FIG. 3a) and in a cross-sectional view (FIG. 3b). The disc 2 comprises a number of guide grooves 13, which indicate the direction in which the information is recorded on the disc 2, i.e. the information is recorded along said spiral grooves 13. Indicated are further in FIG. 3 the tangential direction t and the radial direction r.

FIG. 3b shows as cross-sectional view the different layers of the disc 2 which, in general, comprises a substrate layer 2a, a recording layer or recording stack 2b and a cover layer 2c.

A first embodiment of a recording apparatus according to the present invention is schematically shown in FIG. 4. During recording or read-out the disc 2 is rotated by rotating means 1. A light beam generated by a light source, in particular a laser diode 8, is focused onto the disc by an objective lens 3 after the light beam has passed a collimator lens 7, a polarizing beam splitter 6, a quarter-wave plate 5 and a diaphragm 4. During read-out the polarizing beam splitter 6 reflects light reflected from the disc 2 through a lens 9 on a photo detector (array) 10 for analyzing the reflected light. The general function of such a recording apparatus is widely known and shall therefore not be explained further here. Switching of the aperture's shape can be done mechanically or electrically, in particular by electro-absorptive material or other means. This is indicated by corresponding control means 15.

FIG. 5 shows different embodiments of the diaphragm used in the recording apparatus shown in FIG. 4. FIG. 5 shows a circular diaphragm 4a used for reading data. FIG. 5 shows a diaphragm 4b, essentially having a circular shape, but having two parallel straight sides, i.e. at which sides circular segments have been cut off. FIG. 5 shows another embodiment of a diaphragm 4c having an oval shape. The diaphragms 4b and 4c are used during recording of data. A reduction of the radial numerical aperture is thus obtained by using a non-round aperture wherein the radial width x of the diaphragms 4b, 4c is a fraction of the tangential width y, in particular 0.7 y<x<y.

FIG. 6 shows another embodiment of a recording apparatus according to the present invention. Therein a switchable beam-shaper 14 is provided in the light path between the collimator lens 7 and the PBS 6. In this embodiment use is made of the intrinsic elliptic laser output in combination with the switchable beam-shaper 14 which can make the oval beam more or less round. In case of recording the beam-shaper 14 can be (partially) disabled, for instance electrically or mechanically, by appropriate control means 16 resulting in a lower radial rim-intensity with respect to the tangential rim-intensity which is equivalent to a reduced radial numerical aperture.

The laser diode 8 used to irradiate the disc 2 typically does not have a uniform light intensity distribution, but a Gaussian distribution. Therefore, the light intensity at the rim of the objective lens 3 is usually lower than the light intensity in the middle of the objective lens 3. The amount of relative rim-intensity, with respect to the middle, is also indicated as "pupil filling", i.e. indicates how much light fills the aperture of the lens 3. High rim intensity thus means high filling. Furthermore, typical semiconductor lasers have different widths of the Gaussian distribution in orthogonal directions. To obtain nearly equal rim intensity at a round aperture a so-called beam-shaper is used.

The focussed optical spot profile and marks/pits obtained by the recording method according to the present invention in a groove G (13) separated from another groove G by a land area L are shown in FIG. 7. During reading along the information recording direction t (=tangential direction) a circular optical spot profile 11a is used. Shown are also the recorded marks 12 having an oval profile.

FIG. 8 shows the optical spot profile 11b used for recording of data. As can be seen an oval spot profile 11b is used resulting in oval marks 12. The light intensity of such an oval spot 11b used for recording and generated by the semiconductor laser 8 is shown in FIG. 9. As can be seen both in radial and tangential direction the light intensity shows a Gaussian distribution.

The present invention provides a solution to obtain higher data capacities when recording in particular on recordable optical record carriers. The numerical aperture of the optical means for directing a light beam on the optical record carrier during recording is reduced according to the present invention to obtain a light beam having a substantially oval spot profile during recording, in particular having a smaller width in the tangential direction compared to the width in radial direction.

The invention claimed is:

1. A recording apparatus for recording an information on a recordable optical record carrier (2) by irradiation of a light beam onto said record carrier (2) for forming marks and lands representing said information along an information recording direction (t), comprising:
   a light source (8) for generating a light beam,
   optical means (3-7) for irradiating said light beam onto said record carrier (2)
wherein said optical means comprise means (4) for reducing the numerical aperture of said optical means in the direction orthogonal to the information recording direction (t) during recording of information to obtain a light beam having a substantial oval spot profile having a shorter axis in the information recording direction (t) compared to the direction (r) orthogonal thereto; and
   said means for reducing the numerical aperture comprise switchable means, and control means are provided for controlling said switchable means by switching said switchable means on or off by bringing said switchable means into a light path from the light source to the record carrier during recording.

2. A recording apparatus as claimed in claim 1, wherein said optical means (3-7) are adapted for increasing the numerical aperture of said optical means in the information recording direction (t) during recording of information.

3. A recording apparatus as claimed in claim 1, wherein said means (4) for reducing the numerical aperture comprise a switchable non-round, in particular oval, aperture in the light path from the light source (8) to said record carrier (2) during recording.

4. A recording apparatus as claimed in claim 3, wherein the short axis of said aperture is by a factor of 0.7 to 0.99 shorter than the long axis.

5. A recording apparatus as claimed in claim 1, wherein said means for reducing the numerical aperture comprise a switchable beam-shaper (14) in the light path from the light source (8) to said record carrier (2) during recording to obtain a reduced rim-intensity of the light beam in the direction (r) orthogonal to the information recording direction.

6. A method of recording an information on a recordable optical record carrier (2) by irradiation of a light beam through optical means (3-7) onto said record carrier (2) for forming marks and lands representing said information along an information recording direction (t), wherein the numerical aperture of said optical means (4) is reduced in the direction (r) orthogonal to the information recording direction (t) during recording of information to obtain a light beam having a substantially oval spot profile having a shorter axis in the information recording direction (t) compared to the direction (r) orthogonal thereto; the numerical aperture being switchably reduced by bringing switchable means into a light path of the light beam during recording to turn said switchable means on or off.

7. A computer readable medium encoded with a data structure for causing a computer to perform the steps of the method as claimed in claim 6 when said computer readable medium is run on a computer.

* * * * *